C. F. BARNDT.
BUFFER.
APPLICATION FILED AUG. 18, 1916.

1,263,996. Patented Apr. 23, 1918.

Witness:
Leonard W. Novander

Inventor
Charles F. Barndt
By George Bayard Jones
Atty

UNITED STATES PATENT OFFICE.

CHARLES F. BARNDT, OF RACINE, WISCONSIN.

BUFFER.

1,263,996.  Specification of Letters Patent.  Patented Apr. 23, 1918.

Application filed August 18, 1916. Serial No. 115,640.

*To all whom it may concern:*

Be it known that I, CHARLES F. BARNDT, a citizen of the United States, residing at Racine, in the county of Racine and State of Wisconsin, have invented a certain new and useful Improvement in Buffers, of which the following is a full, clear, concise, and exact description.

My invention relates to improvements in buffers and particularly to buffers for automobile doors.

The objects of the invention are: to provide a buffer which shall act to relieve the shock incident to slamming the door; which shall serve to prevent rattling of the door; which shall properly aline the latch with the opening in the striker plate if the chassis springs or is otherwise distorted, or if the door sags, and which is of simple and economical construction, involving the employment of a minimum amount of rubber.

In the accompanying drawings I have illustrated two forms of the invention. It is to be understood that other forms may be devised, however.

Figure 1:
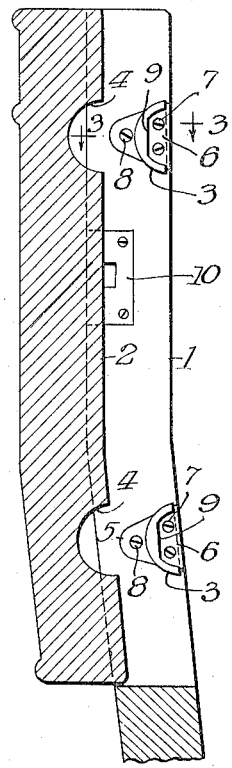
Figure 1 is a section through an automobile door showing the buffer in elevation.
Figure 2:
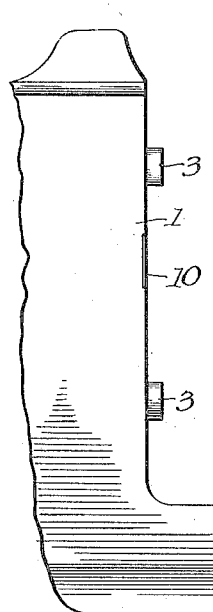
Fig. 2 is a side view of a portion of the automobile body.
Figure 3:
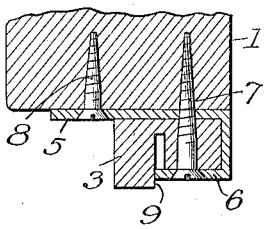
Fig. 3 is a section on the line 3—3 of Fig. 1.

The invention is illustrated in connection with an automobile body 1 having the usual hinged door 2. The buffers 3, of which there are preferably two employed, may be secured either to the body or to the door. In Figs. 1 and 2, they are shown applied to the automobile body, the door having a pair of recesses 4 cut therein which conform to the shape of the buffer. In other words, they are of semi-circular outline, although I do not limit myself to this contour. Each buffer consists of a block of rubber having a suitable backing or supporting plate 5. As shown in Fig. 3, the plate is bent around to form a top flange 6, the rubber block fitting in the channel thus formed and being reinforced thereby to a certain extent. A pair of screws 7 pass through suitable openings in the flange 6, and an additional screw 8 passes through the plate 5. The rubber block is cut away forming a shoulder 9, whereby the flange 6 does not protrude beyond the plane of the outer surface of the rubber block, and is preferably within said plane and substantially in the line of impact when the door is slammed. The edge of said flange, which is preferably in contact with the shoulder 9, forms a reinforcement for the rubber. Said edge, which is of generally semi-circular outline, may have a straight portion as shown representing the chord of the circle, although such straight edge is not essential.

It will be seen that the two buffers are located on opposite sides of the striker plate 10 having the usual opening therein to receive the latch 11 on the door. The location of the buffers 3 and of the recesses 4 is preferably such that the buffers are struck slightly before the door is closed far enough to permit the spring latch to snap into the opening in the striker plate. In other words the rubber is intended to be compressed before the door is fully shut, and remains under compression, whereby an outward pressure is exerted on said door, which prevents rattling of the latch.

The walls of the recess 4 also act as guides and guide the door in its closing movement, whereby the latch is always properly alined with the opening in the striker plate. This is an important feature, as the alinement is not always maintained if the chassis springs or is otherwise distorted, or if the door sags after long use. In the latter case, the buffers serve to lift the door as it is being forcibly closed, thereby insuring the proper latching thereof.

Figure 4:
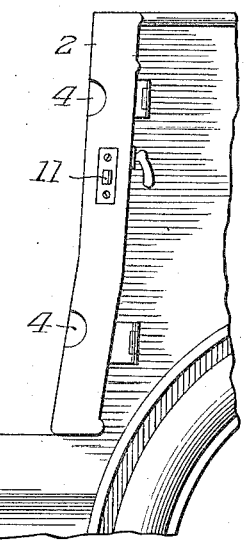
Fig. 4 is an elevation of a modification.
Figure 4:
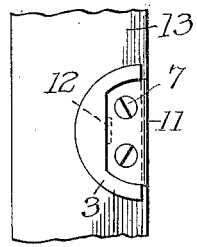
Figure 5:
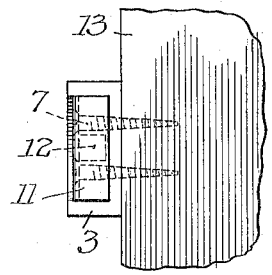
Fig. 5 is a side view thereof.

In Figs. 4 and 5, the construction of the buffer 3 is substantially the same as in the preceding illustration. The reinforcing plate 11' however, is simply a piece of metal of angular cross section, one flange of which furnishes a backing or stop for the rubber buffer and the other flange of which has openings through which the screws pass. An extension or tongue 12 is provided which is received within an opening extending partially through the rubber block and serves to further reinforce the device. The rubber block shown in Fig. 3 may also be provided with said opening, if desired, whereby said blocks may be used interchangeably with either form of reinforcing plate. The buffer illustrated in Figs. 4 and 5, is mounted on an automobile door 13 rather than on the body of the car and the post is cut away, although it will be apparent that either form of bumper may be mounted in either place.

In both forms of the device, it will be seen that the reinforcing flange, which fits within the recess in the buffer, substantially fills said recess whereby the edge of said flange is in contact with the adjacent shoulder on said buffer. This is the preferred arrangement, although in the manufacture of the device, the parts are not always made with sufficient accuracy to avoid a clearance between said parts and, therefore, I do not limit myself to the exact coöperation of the parts illustrated in the drawings. Neither do I intend, by referring to the metal reinforcement as "bent," to limit myself to the use of sheet metal, as other material may be used.

The constructions described have proved to be particularly advantageous when used on automobile doors, although I do not limit myself to their use on vehicles as distinguished from doors otherwise located. Furthermore, various changes may be made in the details of construction without departing from the spirit of the invention.

Having thus described my invention, what I claim as new and desire to secure by Letters Patent of the United States is:

1. A device of the class described comprising a buffer provided with a recess and a slot therein, and a metal holder therefor, said holder being bent to form a reinforcing flange to engage said recess, said flange being provided with a depending lug adapted for engagement with said slot to further reinforce said buffer.

2. A device of the class described, comprising a buffer having a recess in one face thereof, and a metal holder bent to receive said buffer, one flange of said holder being arranged substantially longitudinally with respect to the line of impact and being adapted to fit within said recess and to contact with the walls thereof, whereby the outer portion of said buffer is compressed against said flange when said buffer is subjected to an impact.

In witness whereof, I, hereunto subscribe my name.

CHARLES F. BARNDT.

Copies of this patent may be obtained for five cents each, by addressing the "Commissioner of Patents, Washington, D. C."